United States Patent
Lu et al.

(10) Patent No.: US 8,422,647 B2
(45) Date of Patent: Apr. 16, 2013

(54) SIGNAL TRANSMISSION METHOD

(75) Inventors: Cheng-Hsiung Lu, Xinzhuang (TW); Ching-Feng Hsieh, Taipei (TW)

(73) Assignee: Askey Computer Corporation, Taipei (TW)

( * ) Notice: Subject to any disclaimer, the term of this patent is extended or adjusted under 35 U.S.C. 154(b) by 716 days.

(21) Appl. No.: 12/559,653

(22) Filed: Sep. 15, 2009

(65) Prior Publication Data

US 2010/0310060 A1    Dec. 9, 2010

(30) Foreign Application Priority Data

Jun. 8, 2009 (TW) .............................. 98119006 A

(51) Int. Cl.
*H04M 11/00* (2006.01)
(52) U.S. Cl.
USPC .................. 379/92.04; 379/93.05; 379/93.06; 713/300
(58) Field of Classification Search ............... 379/92.04, 379/93.05, 93.08, 93.06; 713/340, 300
See application file for complete search history.

(56) References Cited

U.S. PATENT DOCUMENTS

2006/0267917 A1* 11/2006 Miernik et al. ............... 345/102
2008/0168283 A1*  7/2008 Penning ........................ 713/310

FOREIGN PATENT DOCUMENTS

TW          574812        5/1991

* cited by examiner

*Primary Examiner* — Gerald Gauthier
*Assistant Examiner* — Simon King
(74) *Attorney, Agent, or Firm* — Edwards Wildman Palmer LLP; Peter F. Corless; Steven M. Jensen

(57) ABSTRACT

A signal transmission method includes using a signal integrating device to receive a first digital signal from a network line or to transmit a second digital thereto; feeding the power transmitted from the network line into the first digital signal to form an integrated signal; using a signal converting device to restore the integrated signal back to the network line power and the first digital signal; converting a first digital signal into a first analog signal or a second analog signal received from outside into a second digital signal; and using a coiled-wire cord connecting the signal integrating device and the signal converting device to transmit the integrated signal from the signal integrating device to the signal converting device or transmit the second digital signal from the signal converting device to the signal integrating device. The invention thereby achieves transmission of digital signals by a coiled-wire cord.

12 Claims, 5 Drawing Sheets

S10 — Providing a signal integrating device connected to a network line to receive a first digital signal or transmit a second digital signal, and combining network line power transmitted over the network line with the first digital signal to form an integrated signal S11 — Providing a signal converting device to restore the integrated signal back to network line power and the first digital signal, and converting the first digital signal into a first analog signal or converting a second analog signal received from outside into the second digital signal S12 — Using a coiled-wire cord to connect the signal integrating device and the signal converting device to transmit the integrated signal from the signal integrating device to the signal converting device and to transmit the second digital signal from the signal converting device to the signal integrating device

FIG.1

SIGNAL TRANSMISSION METHOD

BACKGROUND OF THE INVENTION

1. Field of the Invention

This invention relates to signal transmission methods, and more particularly, to a signal transmission method that transforms signals over a network line to be suitable for transmission over a coiled-wire cord.

2. Description of Related Art

Recently, network phones are becoming popular because more and more people use networks and the cost of using networks to communicate with others is relatively low. A variety of network phones have come to the market, including a network phone having a USB interface, a network phone that directly attaches a network line to its handset, and a network phone that connects a network line to a station used with a wireless handset.

Functionally, a network phone transmits a digital communication signal via an Ethernet cable, for example, and converts the digital communication signal into an audio analog signal, so as to provide phone-like features. Network phones that use USB interface need to be used with a computer. Accordingly, such network phones are tethered or limited to the location of the computer. Moreover, for a network phone that attaches a network line to its handset, a user, when making a phone call, is restricted by the length and inflexibility of the network line, since the network line has a large line radius and poor elasticity. Further, such a handset often has a less than ideal appearance in terms of aesthetics, since it is directly connected to a network line. For a network phone that connects the network line to a station, since the station comprises a variety of components, such as a keyboard and a processor, a user typically has to manipulate the station to dial or access other settings, which is inconvenient and limits the use of space.

TW Pat. No. 574,812 discloses a dual-purpose (analog and IP) intelligent handset, which is applicable to a handset having both analog (POTS) and VOIP capabilities. The handset has a standard RJ-11 jack connectible to a conventional phone line, and an RJ-45 Ethernet port connectable to a broadband network such as ADSL. A user uses the intelligent handset, according to his needs, to make a variety of phone calls, such as a conventional phone call, a VOIP phone call, and an automatically switched phone call, so as to reduce telephone service fees incurred when using a conventional phone line, particularly for long distance. When the intelligent handset uses its "automatic switching function," the handset makes a phone call, allows voice communication with other parties, and provides fast and convenient phone-paging functions. However, the user has to dial or access settings via a station, which is inconvenient.

Although the above connection methods work, users have grown accustomed to the appearance and usage of a conventional coiled-wire cord that is extendable and automatically retracts when not under tension to save space and conveniently organize the cord in a safe manner. It would be attractive to be able to provide a handset with IP capability that could use the familiar advantages of the traditional coiled-wire type of phone cord. Therefore, devising a method to transmit network signals via a coiled-wire cord, such that the method can be realized in a network phone to allow a user to dial and access settings with a handset, is highly desirable in the art.

SUMMARY OF THE INVENTION

In views of the above-mentioned problems of the prior art, the present invention provides a signal transmission method that converts signals over a network line into integrated data signals that are suitable for transmission over a coiled-wire cord.

In an embodiment of the present invention, the signal transmission method includes: using a signal integrating device connected to a network line to receive a first digital signal or transmit a second digital signal, and to combine network line power transmitted over the network line with the first digital signal to form an integrated signal; using a signal converting device to restore the integrated signal back to network line power and the first digital signal, and to convert the first digital signal into a first analog signal or to convert a second analog signal received from outside into the second digital signal; and using a coiled-wire cord to connect the signal integrating device and the signal converting device, to transmit the integrated signal from the signal integrating device to the signal converting device or to transmit the second digital signal from the signal converting device to the signal integrating device.

In another embodiment of the present invention, the signal integrating device adjusts the voltage level of the network line power to be less than 30 volts, and amplifies the first digital signal and the second digital signal.

In yet another embodiment of the present invention, the signal integrating device is a station of a network phone, and the signal converting device is a handset of the network phone. The first digital signal received by the station over the network line and the second digital signal transmitted by the station over the network line are digital communication signals. The handset converts the received digital communication signal into an analog communication signal.

Compared with the prior art, the signal transmission method according to the present invention provides a signal integrating device to capture a digital signal via a network line and amplify the digital signal. At the same time, network line power is also captured from the network line, and fed into the digital signal to form an integrated signal, which is transmitted via a coiled-wire cord to a signal converting device for signal processing. Therefore, in the application of the method of the present invention to a network phone, the coiled-wire cord can transmit an integrated signal that includes power and digital signals. Accordingly, a variety of elements, such as a keyboard and a processor, can be installed in the handset, allowing the handset to convert a digital signal to an analog signal and vice versa. As such, the handset can be designed to have a simple structure, and the user can conveniently dial directly from the handset.

BRIEF DESCRIPTION OF DRAWINGS

FIG. 1 is a flow chart of a signal transmission method according to the present invention;

DETAILED DESCRIPTION OF PREFERRED EMBODIMENTS

The following illustrative embodiments are provided to illustrate the disclosure of the present invention. These and other advantages and effects can be readily understood by those in the art after reading the disclosure of this specification. The present invention can also be performed or applied by other embodiments. The details of the specification may be altered in terms of various aspects or to apply the invention to differing applications, and numerous modifications and variations can be devised without departing from the spirit and scope of the present invention.

Figure 5:
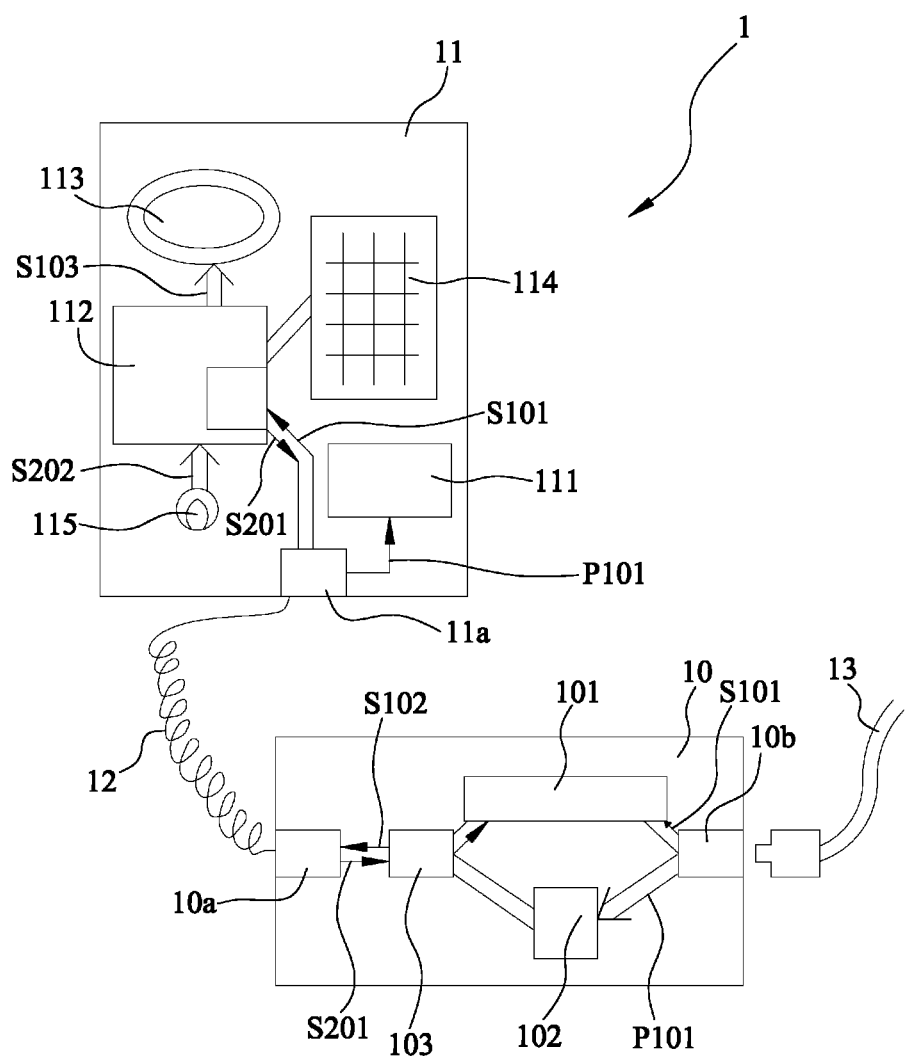
FIG. 5 is a schematic diagram of a signal transmission system for carrying out a signal transmission method according to the present invention.

FIG. 1 is a flow chart of a signal transmission method applied to a signal transmission system 1 shown in FIG. 5 according to the present invention. As shown in FIG. 1, the signal transmission method comprises the following steps.

In step S10, a signal integrating device 10 connected to a network line 13 is provided to receive a first digital signal S101 or transmit a second digital signal S201, and to combine network line power P101 transmitted over the network line 13 with the first digital signal S101 to form an integrated signal S102. The signal integrating device 10 adjusts the voltage level of the network line power P101. Then, the signal integrating device 10 amplifies the first digital signal S101 and the second digital signal S201. A central tap structure element 103 is installed in the signal integrating device 10 for combining the network line power P101 with the first digital signal S101 to form the integrated signal S102.

In step S11, a signal converting device 11 is provided to restore the integrated signal S102 back to the network line power P101 and the first digital signal S101, and to convert the first digital signal S101 to a first analog signal S103 or convert a second analog signal S202 received from outside to the second digital signal S201.

In step S12, a coiled-wire cord 12 connects the signal integrating device 10 with the signal converting device 11, to transmit the integrated signal S102 from the signal integrating device 10 to the signal converting device 11 or transmit the second digital signal S201 from the signal converting device 11 to the signal integrating device 10.

Figure 2:
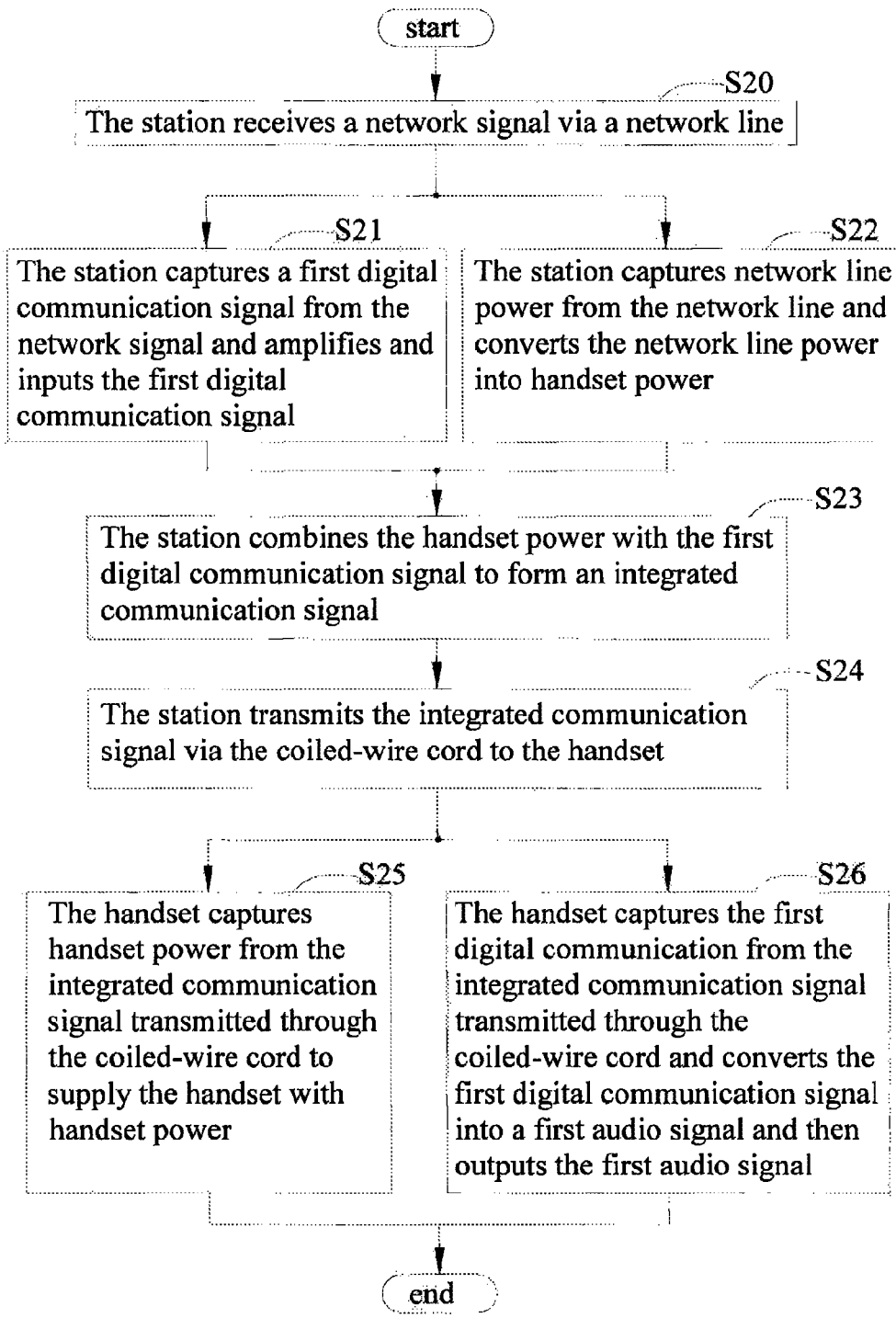
FIG. 2 is an operational flow chart of a signal transmission method that is applied to a network phone according to the present invention.
Figure 3:
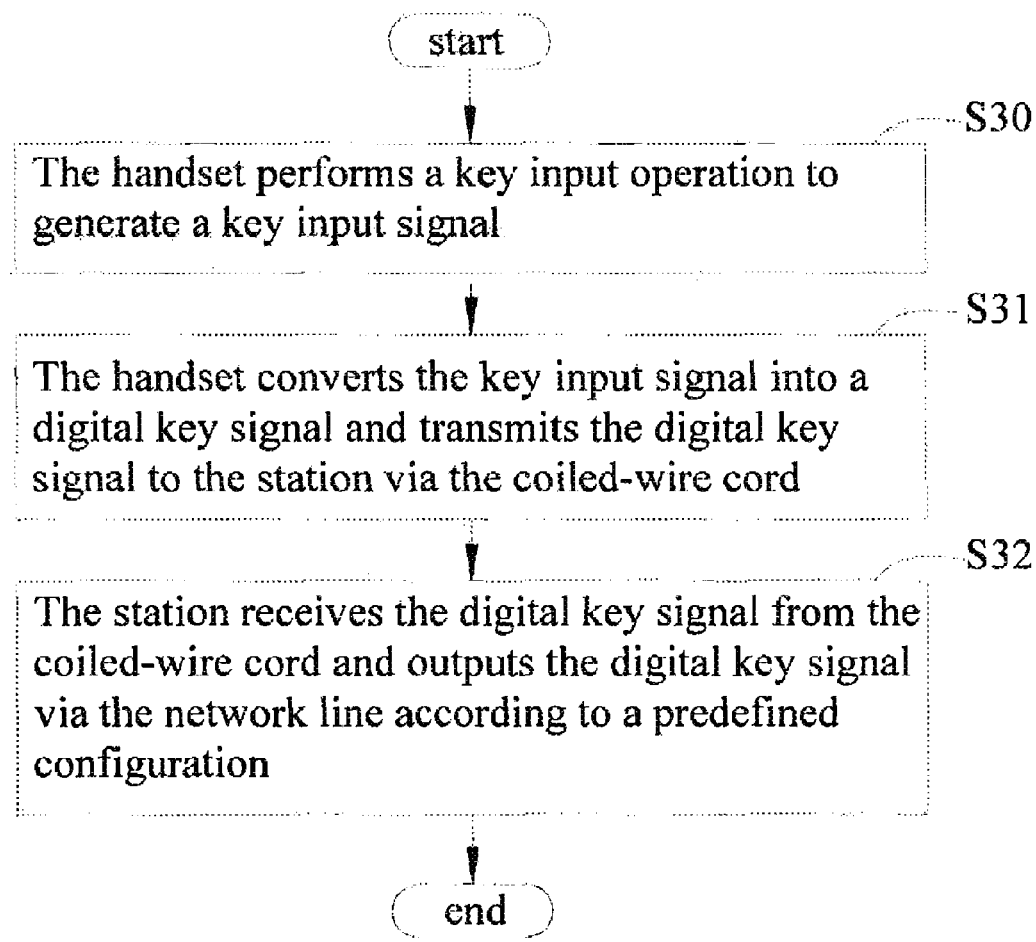
FIG. 3 is a flow chart of a signal transmission method that is applied to a network phone of an embodiment according to the present invention.
Figure 4:
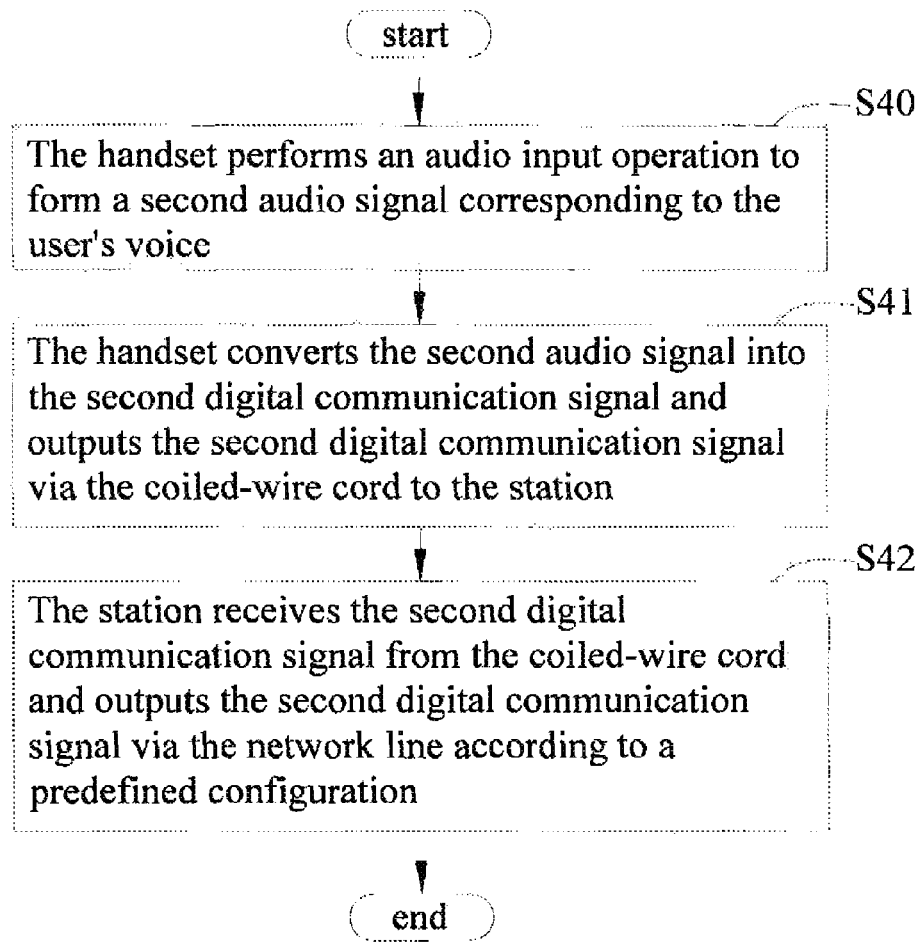
FIG. 4 is a flow chart of a signal transmission method that is applied to a network phone of another embodiment according to the present invention.

FIGS. 2-4 provide operational flow charts of a signal transmission method applied to a network phone (e.g., the signal transmission system 1) according to the present invention. The network phone 1 comprises a station (e.g., the signal integrating device 10) connected to at least one network line 13, a handset (e.g., the signal converting device 11), and a coiled-wire cord 12 that connects the station 10 and the handset 11. A four-wire jack 11a, 10a may be connected between the handset 11 and the coiled-wire cord 12 and between the station 10 and the coiled-wire cord 12. In an embodiment of the present invention, the four-wire jack 11a, 10a is, but is not limited to, an RJ22 (4P4C) interface. An eight-wire jack 10b may be connected between the network line 13 and the station 10. In an embodiment of the present invention, the eight-wire jack 10b is, but is not limited to, an RJ45 (8P8C) interface.

The station comprises a signal bridging unit 101, a power converting unit 102 and a combining unit (e.g., the central tap structure element 103) connected to the signal bridging unit 101 and the power converting unit 102. The handset 11 comprises a power capturing unit 111, a processing unit 112, a keyboard unit 114, an audio input unit 115, and an audio output unit 113, wherein the keyboard unit 114, the audio input unit 115 and the audio output unit 113 are connected to the processing unit 112.

The steps of the signal transmission method according to the present invention are described in detail in accordance with the basic components of the above-described network phone and FIGS. 2-4.

FIG. 2 describes receiving network signals via a network line. First, the method executes step S20, in which the network signals are received at the station 10 via the network line 13. The method then execute steps S21 and S22, sequentially or simultaneously.

In step S21, at the station, the signal bridging unit 101 captures a first digital communication signal (a signal transmitted over the network line by a far end user) from the network signals, and amplifies and outputs the first digital communication signal. The signal bridging unit 101 is, for example, a bridge, a converter, a hub or a signal relay apparatus. In an embodiment of the present invention, the signal bridging unit 101 is a switching hub.

In step S22, at the station 10, the power converting unit 102 captures network line power from the network signals and converts the network line power into power to power the handset 11. The power converting unit 102 is, for example, a DC/DC converter. In an embodiment of the present invention, the network line power has a voltage level equal to 48 volts, while the handset power has a voltage level less than 30 volts, or preferably less than 12 volts, depending on the thickness and material of the coiled-wire cord 12 and the safe voltage level that the coiled-wire cord 12 can transfer. Next, proceed to step S23.

In step S23, at the station 10, the combining unit 103 combines the handset power with the first digital communication signal to form an integrated communication signal. The combining unit 103 is, for example, a transformer having a central tap structure. Then, proceed to step S24.

In step S24, the coiled-wire cord 12 transfers the integrated communication signal to the handset 11. In particular, the integrated communication signal is transmitted to the handset 11 via the RJ22 interface 11a, 10a to interconnect the station 10, the handset 11 and the coiled-wire cord 12.

In step S25, at the handset 11, the power capturing unit 111 captures the handset power from the integrated communication signal transmitted from the coiled-wire cord 12 to supply the handset 11 with handset operational power.

In step S26, at the handset 11, the processing unit 112 captures the first digital communication signal from the integrated communication signal transmitted from the coiled-wire cord 12 and converts the first digital communication signal into a first audio signal (i.e., an analog signal that the user of the handset 11 receives). The audio output unit 113 outputs the first audio signal. The user can then hear the first audio signal output from the audio output unit 113 to either know that a network phone is dialing or to acquire communication sounds of the calling party. In an embodiment of the present invention, the audio output unit 113 is a receiver or a speaker.

FIG. 3 provides an exemplary embodiment wherein a key input signal is transmitted over a network line to call the other party. In step S30, a user uses the keyboard unit 114 of the handset 11 to perform a key input operation to generate a key input signal. Then, proceed to step S31.

In step S31, at the handset 11, the processing unit 112 converts the key input signal into a digital key signal (a signal transmitted from the handset to a far end user), and transmits the digital key signal to the station 10 via the coiled-wire cord 12. In particular, the digital key signal is output to the station 10 via the RJ22 11a jack between the handset 11 and the coiled-wire cord 12, the coiled-wire cord 12, and the RJ22 jack 10a between the station 10 and the coiled-wire cord 12. Then, proceed to step S32.

In step S32, at the station, the second digital communication signal is received from the coiled-wire cord 12, and is output via the network line according to a predefined configuration. In particular, the feeding unit outputs the digital key signal to the signal bridging unit 101, allowing the signal bridging unit 101 to output the digital key signal via the RJ45 jack 10b between the station 10 and the network line 13 according to a predefined configuration, such that a network phone at a far end can receive the digital key signal and know that there is a call. The above predefined configuration may utilize a four-conductor wire coiled-wire cord and a circuit configuration corresponding to the coiled-wire cord. Such a configuration technique is well-known in the related art, and further description is hereby omitted.

Note that in the above embodiment, it is exemplified that the key input signal is converted by the keyboard unit 114 into the digital key signal and transmitted to the other party. In another embodiment of the present invention, an audio input unit 115 generates an audio signal, converts the audio signal into a digital communication signal, and transmits the digital communication signal to the other party. The manner in which the signal transmission method of the present invention implements transmission of an audio signal to the other party during a communication state will be described in the following in accordance with FIG. 4.

In step S40, a user uses the audio input unit 114 of the handset 11 to perform an audio input operation to generate a second audio signal. The audio input unit is, for example, a microphone that allows the user to input the second audio signal during a communication process. Then, proceed to step S41.

In step S41, at the handset 11, the processing unit 112 converts the second audio signal into a second digital communication signal (a digital signal transmitted from the handset 11 to a far end) and transmits the second digital communication signal to the station 10. In particular, the second digital communication signal is output from the handset 11 via an RJ22 jack 11a between the handset 11 and the coiled-wire cord 12, then through the coiled-wire cord 12, and then via another RJ22 jack 10a between the coiled-wire cord 12 and the station 10. Then, proceed to step S42.

In step S42, at the station 10, the second digital communication signal is received from the coiled-wire cord 12, and is output via the network line 13 according to a predefined configuration. In particular, the combining unit 103 outputs the second digital communication signal to the signal bridging unit 101, allowing the signal bridging unit 101 to output the second digital communication signal via the RJ45 interface 10b between the station 10 and the network line 13, such that a network phone at a far end can receive the sounds of the calling party.

As described previously, the signal transmission method according to the present invention includes capturing a digital data signal from network signals received over a network line, and amplifying and outputting the digital data signal. At the same time, network line power is captured from the network and is converted into device power. Then, the device power is combined with the digital data signal to form an integrated data signal, which is transmitted via a coiled-wire cord. In this way, signals over the network line can be converted to be an integrated power and data signal that is suitable for transmission over a coiled-wire cord, without losing the integrity of the signals and the endurance and safety of the coiled-wire cord. Therefore, a user end device that is connected to the coiled-wire cord can be designed to have both pleasing appearance and practical usage.

The foregoing descriptions of the detailed embodiments are provided to illustrate and disclose the features and functions of the present invention and are not intended to be restrictive of the scope of the present invention. It should be understood by those in the art that various modifications and variations can be made according to the spirit and principles in the disclosure of the present invention and still fall within the scope of the appended claims.

What is claimed is:

1. A signal transmission method, comprising:
employing a signal integrating device connected to a network line to receive a first digital signal or transmit a second digital signal, and to combine network line power transmitted over the network line with the first digital signal to form an integrated signal;
employing a signal converting device to decompose the integrated signal back to the network line power and the first digital signal, and to convert the first digital signal into a first analog signal or to convert a second analog signal into the second digital signal; and
connecting a coiled-wire cord to the signal integrating device and to the signal converting device to transmit the integrated signal from the signal integrating device to the signal converting device or to transmit the second digital signal from the signal converting device to the signal integrating device.

2. The signal transmission method of claim 1, further comprising employing the signal integrating device to adjust the voltage level of the network line power.

3. The signal transmission method of claim 2, wherein the adjusted voltage level of the network line power is less than 30 volts.

4. The signal transmission method of claim 1, wherein the signal integrating device amplifies the first digital signal and the second digital signal.

5. The signal transmission method of claim 1, further comprising installing a central tap structure element in the signal integrating device, the central tap combining the network line power with the first digital signal to form the integrated signal.

6. The signal transmission method of claim 1, wherein the signal converting device further obtains operational power from the decomposed network line power.

7. The signal transmission method of claim 1, wherein the network line is an Ethernet cable.

8. The signal transmission method of claim 1, wherein the signal integrating device is a station of a network phone, and the signal converting device is a handset of the network phone.

9. The signal transmission method of claim 8, wherein the first digital signal received by or the second digital signal transmitted by the handset over the network line is a digital communication signal.

10. The signal transmission method of claim 9, wherein the handset converts the digital communication signal into an analog communication signal.

11. The signal transmission method of claim 8, wherein the coiled-wire cord connects the station and the handset via an RJ22 (4P4C) interface.

12. The signal transmission method of claim 8, wherein the handset is connected to the network line via an RJ45 (8P8C) interface.

* * * * *